122,949

UNITED STATES PATENT OFFICE.

WILLIAM JESTY, OF GOSPORT, ENGLAND.

IMPROVEMENT IN PAINTS FOR SHIPS' BOTTOMS AND OTHER SURFACES.

Specification forming part of Letters Patent No. 122,949, dated January 23, 1872.

I, WILLIAM JESTY, of Gosport, England, have invented "a new and useful Compound or Composition for Coating Ships' Bottoms and other Surfaces," of which the following is a specification:

My invention relates to a new compound or composition, which is chiefly designed for coating the bottoms of sea-going vessels to prevent their destruction by the corrosive action of salt water. It may, however, also be applied to wood, stone, iron, brick, and other material used for building purposes, to protect them against atmospheric and other destructive agencies.

The said composition or compound consists of gas-lime, mercury, iron-rust, sulphate of copper, Japan gold size, boiled oil, (preferably linseed-oil,) sugar of lead, and creosote. These substances or ingredients are combined in or nearly in the following proportions, viz.: Gas-lime, one pound; mercury, one pound; iron-rust, one pound; sulphate of copper, one pound; Japan gold size, one gallon; boiled oil, one pint; sugar of lead, two ounces; creosote, one quart. These quantities will produce about one and one-half gallons of the composition.

The above substances are thoroughly mixed together and ground in a suitable mill till they acquire the consistency of ordinary paint, and the compound or composition is then ready for use. Its application to the ship's bottom or other surface to be coated is effected with an ordinary painter's brush.

Claim.

The composition or compound of gas-lime, mercury, iron-rust, sulphate of copper, Japan gold size, boiled oil, sugar of lead, and creosote, in or about in the above-specified proportions, for the purposes set forth.

WILLIAM JESTY.

Witnesses:
    C. W. MEREDITH,
        *Forton Hauts, Gentleman.*
    A. NEWMAN,
        *Clerk to Mr. Edwd. Hoskins.*